(12) United States Patent
Miles

(10) Patent No.: US 7,722,189 B2
(45) Date of Patent: May 25, 2010

(54) MULTIPLE-VIEW DISPLAY FOR NON-STEREOSCOPIC VIEWING

(76) Inventor: Mark W Miles, Bldg. 43, Fort Mason, San Francisco, CA (US) 94123

( * ) Notice: Subject to any disclaimer, the term of this patent is extended or adjusted under 35 U.S.C. 154(b) by 753 days.

(21) Appl. No.: 11/182,533

(22) Filed: Jul. 15, 2005

(65) Prior Publication Data

US 2006/0268240 A1    Nov. 30, 2006

Related U.S. Application Data

(63) Continuation-in-part of application No. 11/136,111, filed on May 24, 2005.

(51) Int. Cl.
*G03B 21/00* (2006.01)
*G02B 27/22* (2006.01)
*H04N 9/47* (2006.01)

(52) U.S. Cl. .............................. 353/7; 353/10; 353/121; 359/463; 359/478; 348/59; 348/744

(58) Field of Classification Search ................. 353/94, 353/7, 10, 30, 121, 122; 359/443, 453–457, 359/458, 459, 460, 462, 463, 478, 558, 563, 359/565; 348/42, 54, 59, 739, 744; 345/419; 349/15

See application file for complete search history.

(56) References Cited

U.S. PATENT DOCUMENTS

| 6,046,846 | A | * | 4/2000 | van de Ven | 359/455 |
| 6,055,027 | A | * | 4/2000 | Yamazaki et al. | 349/15 |
| 6,064,452 | A | * | 5/2000 | Ogino | 349/57 |
| 6,556,627 | B2 | * | 4/2003 | Kitamura et al. | 375/240.26 |
| 2003/0016444 | A1 | * | 1/2003 | Brown et al. | 359/462 |
| 2003/0020885 | A1 | * | 1/2003 | Suzuki | 353/71 |
| 2003/0112523 | A1 | * | 6/2003 | Daniell | 359/626 |
| 2004/0223217 | A1 | * | 11/2004 | Yoon et al. | 359/455 |
| 2005/0185047 | A1 | * | 8/2005 | Hii | 348/36 |
| 2006/0284974 | A1 | * | 12/2006 | Lipton et al. | 348/59 |

* cited by examiner

*Primary Examiner*—Rochelle-Ann J Blackman
(74) *Attorney, Agent, or Firm*—Hahn and Moodley LLP; Vani Moodley, Esq.

(57) ABSTRACT

In one embodiment, the invention provides a method. The method comprises projecting multiple scenes simultaneously on a display screen in interlaced-fashion; and directing light for each scene to a distinct viewing zone defined spatially in relation to the display screen. A system comprising a display; and a lenticular mechanism coupled to the display and having a plurality of lens elements to direct light from the display into distinct viewing zones defined spatially in relation to the display is also provided.

24 Claims, 7 Drawing Sheets

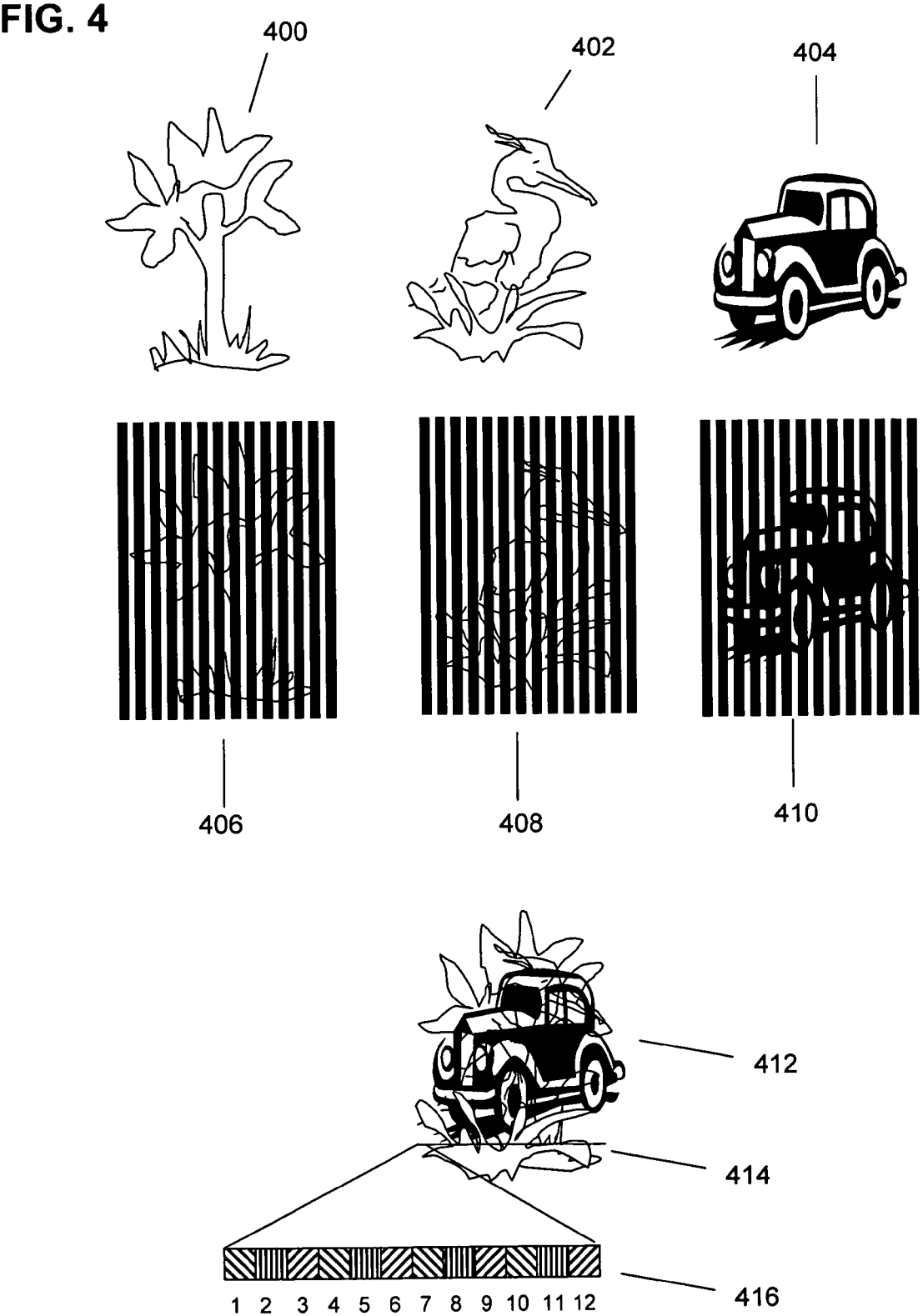

FIG. 7
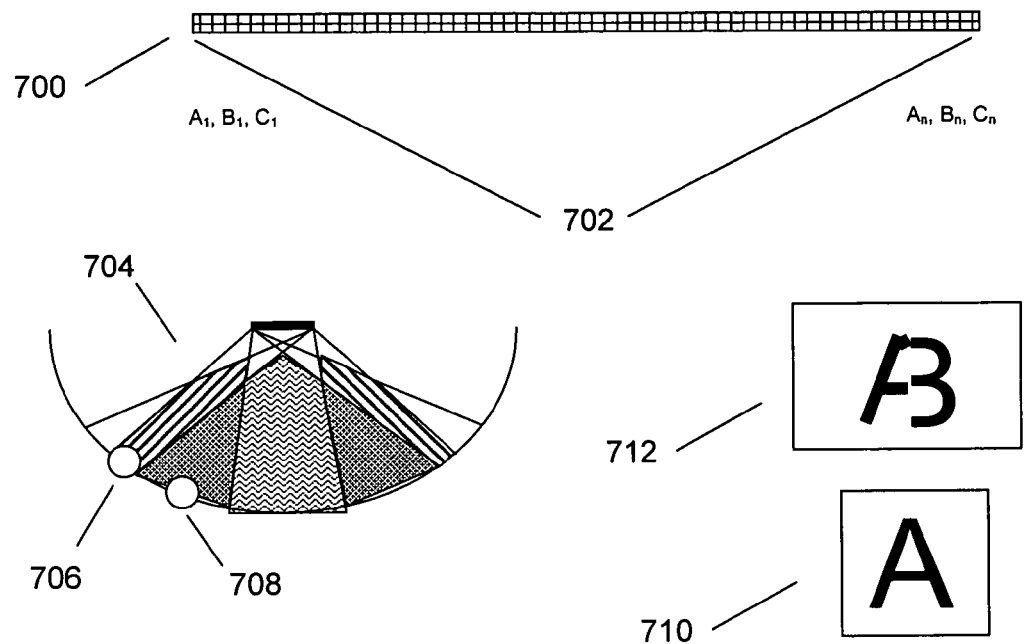
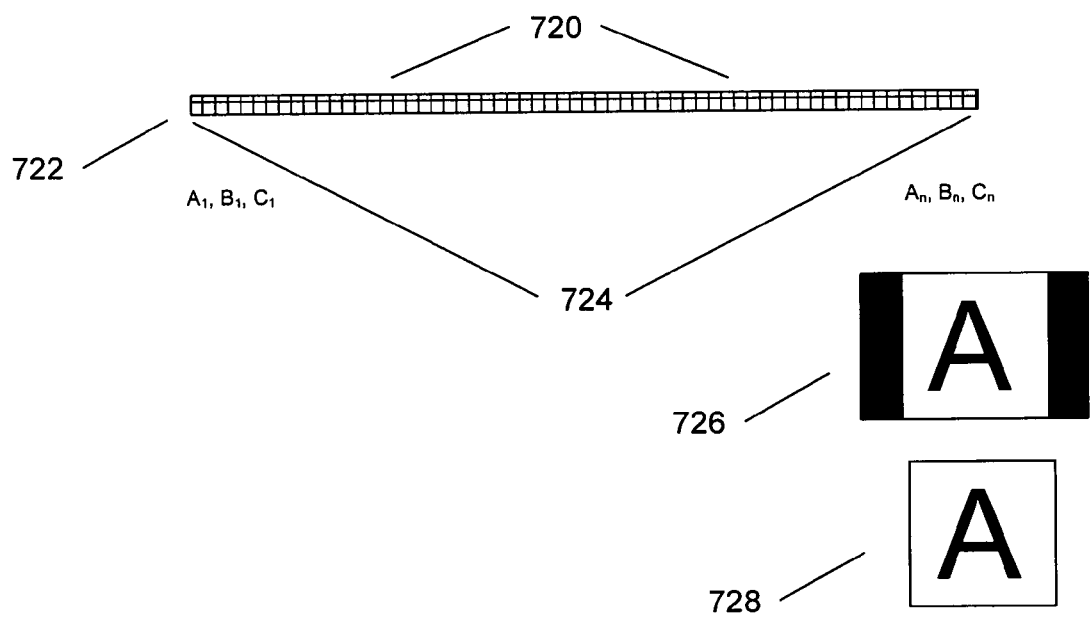

MULTIPLE-VIEW DISPLAY FOR NON-STEREOSCOPIC VIEWING

CROSS REFERENCES

This application is a continuation-in-part of U.S. Ser. No. 11/136,111 filed 24 May 2005.

FIELD

Embodiments of this invention relate to displays.

BACKGROUND

Multiple-view displays attempt to project two views of video data to a viewer in order to achieve a stereoscopic effect. The inventor has determined that there may be uses for a multiple-view display which does not achieve a stereoscopic effect. For example in order to create an immersive environment, such as is described in co-pending U.S. patent application Ser. No. 11/136,111 (which is hereby incorporated by reference), a multiple-view display which achieves a stereoscopic effect is not required.

SUMMARY

In one embodiment of the invention, a multiple-view display which does not achieve a stereoscopic effect is described. Techniques for formatting video data for rendering on such a multiple-view display are also described.

Other aspects of the invention will be apparent from the detailed description below.

BRIEF DESCRIPTION OF THE DRAWINGS

FIG. 4 illustrates how data for a multiple-view display may be formatted in accordance with one embodiment of the invention;

FIG. 7 illustrates a data formatting technique in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
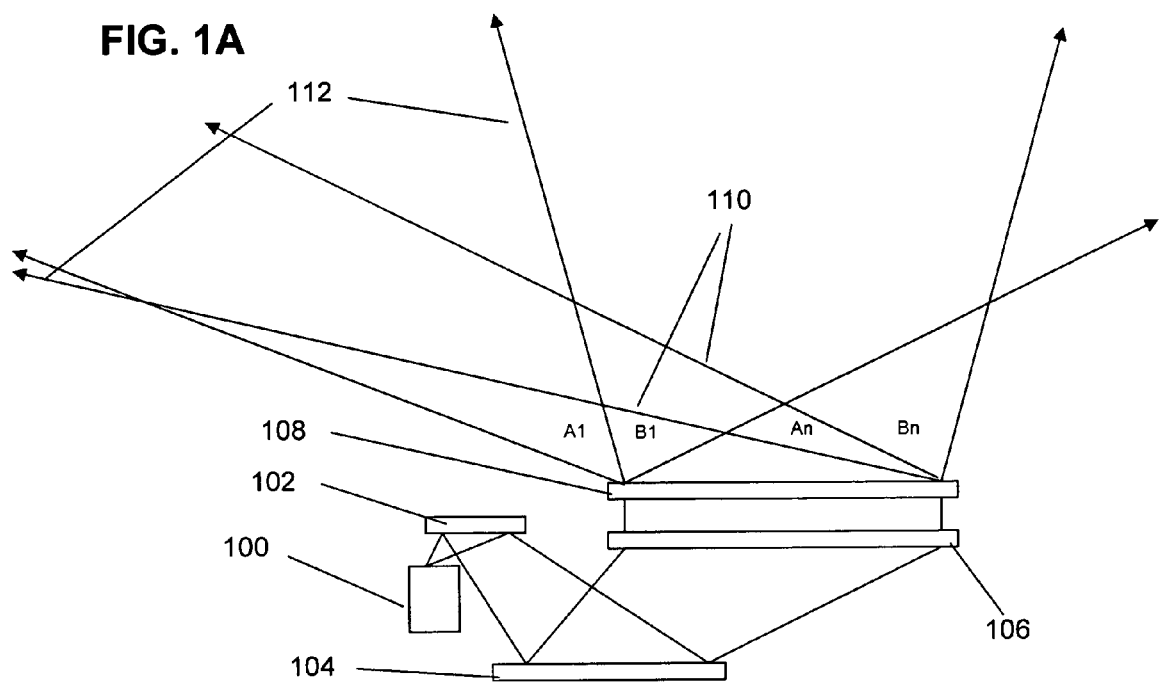
FIG. 1A shows one example of a multiple-view display in accordance with one embodiment of the invention.
Figure 1B:
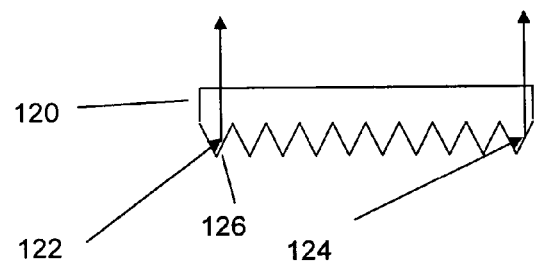
FIG. 1B shows a detailed view of one embodiment of a fresnel lens of the multiple-view display of FIG. 1.
Figure 1C:
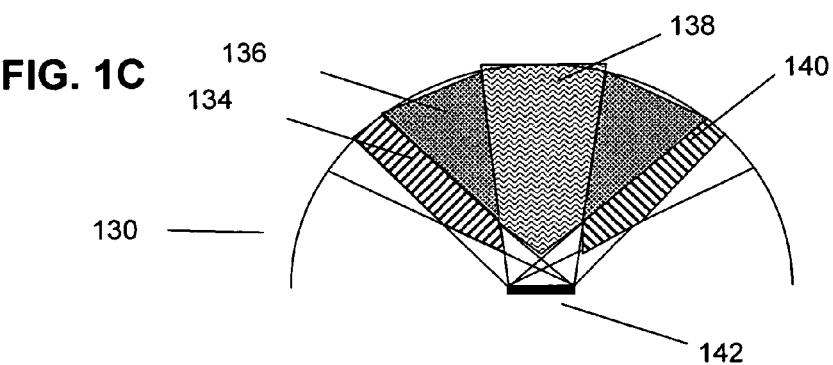
FIG. 1C illustrates the viewing cone pattern for the multiple-view display of FIG. 1A.

Referring now to FIG. 1, one embodiment of an multiple-view display in the form of an Omni-Directional Window (ODW) is illustrated. Optical projector 100 is shown directing image light to mirror 102. The optical projector may be based on any one of a number of well known technologies in commercial use including Digital Light Projectors (DLPs) and Liquid Crystal on Silicon (LCOS) modulators. Light from mirror 102 is redirected towards mirror 104 and subsequently directed towards fresnel lens 106. The two mirrors and the fresnel lens function as a folded optical system which helps to reduce the overall size of the system and is in common use in Rear Projection Televisions (RPTVs). Fresnel lens 106 serves to collimate the incident light so that a uniformly collimated light field is now incident on to lenticular sheet 108. Detail of the fresnel lens is shown in 120. The sawtooth features reflect light rays 122, and 124 using Total Internal Reflection (TIR). Light which enters the medium and then attempts to exit, for example at point 126, can be reflected via TIR if the angle is correct. A properly designed lens array will have features whose dimensions and geometry vary across the sheet such that the light entering at varying predetermined angles is redirected at an angle which is normal to the sheet.

A lenticular sheet is an array of linear lens elements stamped in a suitable transparent medium, the exact functioning of which will be explained in greater detail subsequently. The lenticular sheet is defined and positioned, for this example, such that each lens corresponds to a group of three pixels. The pixels are labeled A, B, and C with the number of pixels in a horizontal line (in the plane of the page) of the display being n. Thus the pixels are numbered from 1 to n. The geometry and focal length of the lenses varies across the sheet so that the light from each subset of pixels is directed into a viewing cone which is fundamentally divergent. The viewing cone 110 bounds the light that is emitted by the vertical row (out of the plane of the page) of An pixels. This is unlike the convergent nature of viewing cones used for autostereoscopic applications. Light which is emitted by the A1-An pixel subset is directed into the A viewing cone whose outer limits are defined by the ray boundaries 112. The B pixel subset is directed as indicated and C is not shown.

The resulting viewing cone pattern is illustrated in 130. The ODW is represented by 142. Viewing cone 134 corresponds to the image data associated with the A pixel subset, viewing cone 138 is associated with the B pixel subset, and viewing cone 140 associated with the C pixel subset. One of the limitations of this viewing cone pattern is that there are regions of perspective overlap. A viewer residing in viewing cone 136, for example, would see images from both A and B pixel subsets.

Figure 2A:
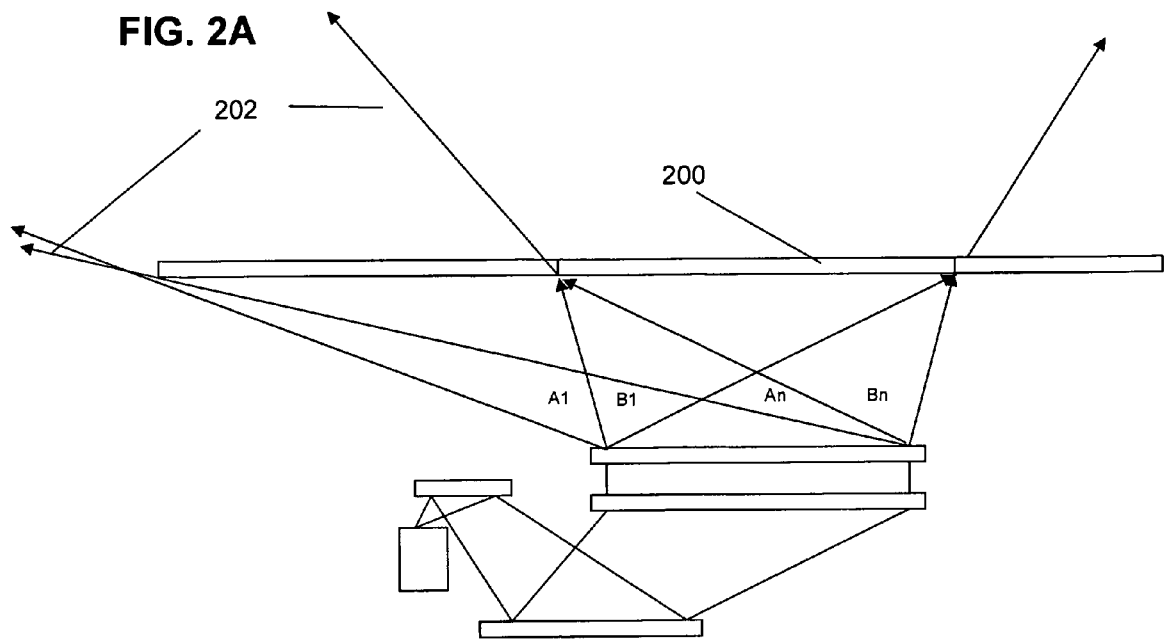
FIG. 2A shows another example of a multiple-view display in accordance with one embodiment of the invention.
Figure 2B:
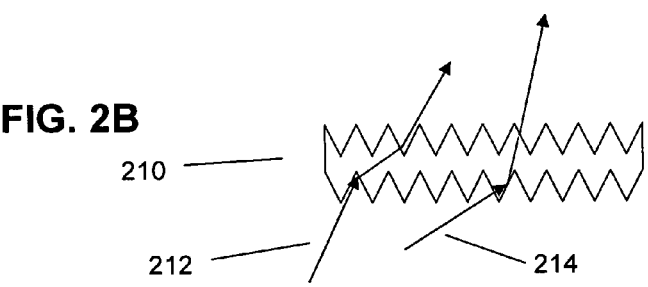
FIG. 2B shows a detailed view of a fresnel array of the multiple-view display of FIG. 1.
Figure 2C:
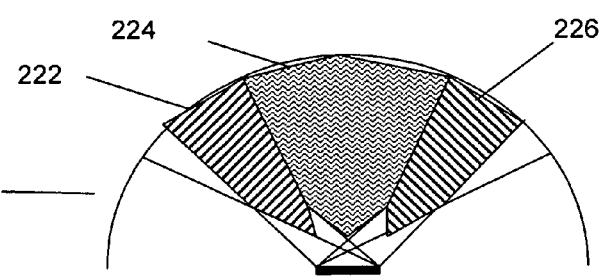
FIG. 2C illustrates the viewing cone pattern for the multiple-view display of FIG. 2A.

Referring to FIG. 2, an alternative ODW is shown with a transfer element in the form of an asymmetric fresnel array 200. The function of this array is to act on incident light in a way which also varies depending on the angle of incidence of the light. One potential transfer function would be for the array to have a more significant effect on light arriving from off normal angles than that arriving from angles near normal. Many other transfer functions are possible. Fresnel array 210 is one embodiment of such an array. In this case, microstructures are defined on both sides of the sheet. A variety of different microstructures and/or thin film coatings may be used to optimize the performance of this array. They are patterned to be approximate complements of each other in this case. Ray 212, which is incident near normal, is allowed to exit at the same angle because it does not experience total internal reflection (TIR). Ray 214, on the other hand, experiences TIR upon entry and its angle is modified. With proper design of this component, the exit boundaries of incident cones can be redefined so that overlapping view cones can be eliminated or significantly mitigated. Viewing cone pattern 220 is an example where the overlap zones are eliminated.

Figure 3A:
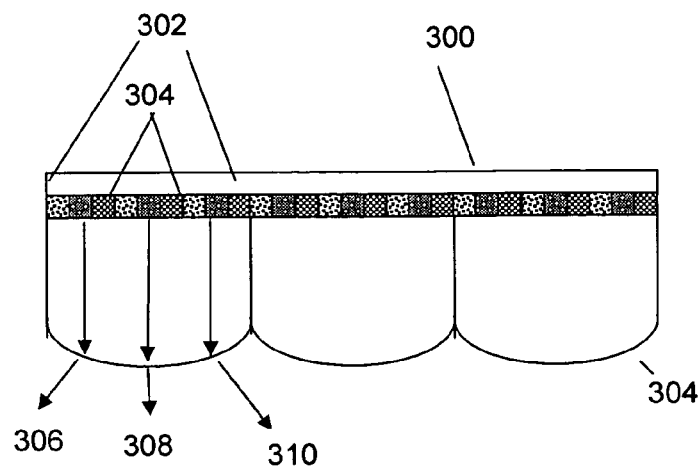
FIGS. 3A, 3B and 3C show examples of a lenticular array in accordance with embodiments the invention.
Figure 3B:
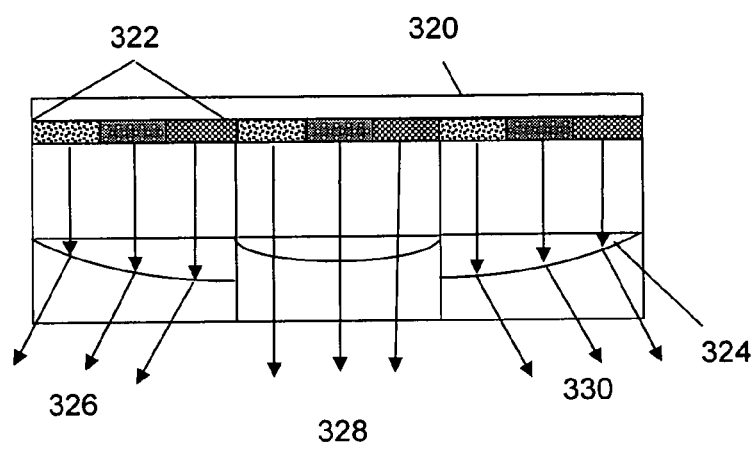
Figure 3C:
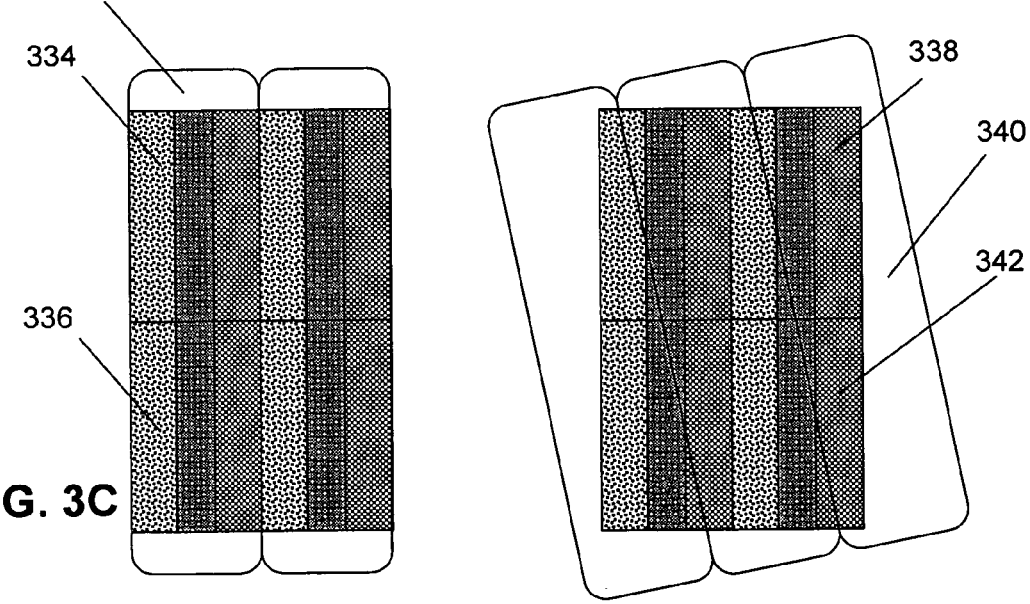

Referring to FIG. 3, a section of a display 300 is shown illustrating three sets of tripixels one of which is 302. Each tripixel, contains three pixels, corresponding to the aforementioned A, B, and C pixel subsets, with tripixel 302 containing pixel 304. Each pixel comprises a subpixel colored red, green and blue. Lenticular lens array, 304, is shown coupled to the display and aligned in a way such that each lens element encompasses as single tripixel. The behavior of the lens is such that light from a particular tripixel is output in one of three directions depending on the position of the pixel within the tripixel array. Pixel 304, for example, outputs light along the direction indicated by arrow 306. The remaining pixels of that tripixel output light as indicated by arrows 308 and 310.

Using this configuration, the number of views is limited by the number of pixels which are encompassed by each lens. This occurs at the cost of display resolution which goes down linearly in relation to the number of views. A normal display with a horizontal resolution of 1200 pixels can display three views with a horizontal resolution of 400 pixels. One alternative means for increasing the resolution of the fundamental display is to use a display medium which can produce a non-pixelated output. A cathode ray tube (CRT) for example uses an electron beam to create a continuous scan line in a display. By substituting in place of a digital modulator (DLP, LCD, LCOS, etc.), the resolution of the window is no longer limited by the number of pixels. It is now limited by the ability of the CRT drive electronics to define and illuminate points of smaller and smaller size as the electron beam is scanned. Both of these approaches rely on spatial techniques for portraying the additional information.

Yet another approach involves using a dynamic lenticular lens. Display segment 320, is shown with a single rgb pixel 322, encompassed by dynamic lens 328. A dynamic lens can be made using a variety of techniques utilized within the industry. One is known as electrowetting which is described in a paper entitled "Variable Focus Liquid Lens for Miniature Cameras" by S. Kuiper et. al. and hereby incorporated by reference. Oil film 324, acts as lens due to the fact that its index of refraction is different than that of the surrounding medium and that it has a geometry that is dictated in part by the forces of surface tension.

The incorporation of electrode structures into the lens allows for electrostatic forces to be applied to the oil lens. The consequence is that the geometry of the lens can be changed in ways that allow light from the pixels to be redirected along the direction of arrows 326, 328, and 330, for example. If the focus of the lens is changed in a way which is synchronized with the scanning of the display, then successive frames (subframes) of the image can be used to display the different views. This requires that the frame rate (refresh rate) be increased. Thus a window with three views would have its frame rate increased by a factor of three in order to provide a total of nine views in a single frame. The advantage of this approach is that no resolution is lost as the number of views is increased. Switchable lenticular lenses based on liquid crystal materials, or MEMS structures may also be utilized.

Yet another approach relying on spatial techniques may also be applied. Pixels 334, and 336, shown in a plan view, are a part of a four pixel group, and are encompassed by lenticular lens 332. This operates in the same fashion as display section 300 above. Pixels 338 and 342, are a part of another four pixel group shown in a plan view. In this case lenticular lens 340, part of a group of three, is shown placed upon the group at an angle which is not parallel to the pixels. Specifically the lens array is placed at an angle of 9.5 degrees. By arranging the lenses in such a fashion, part of the burden of increased horizontal views may be supported at the sacrifice of vertical resolution. In this case, a display with a nominal resolution of 2700×1200 can achieve nine views, each of which has a resolution of 900×400. With the lenses placed in a parallel fashion the effective resolution of each view is 300×1200. This technique is described in a paper entitled "Multi-user 3D Displays", by C van Berkel and J. H. A Schmitz and hereby incorporated by reference. The aforementioned approaches may be used in combination as well to increase the number of views supported by each screen.

Use of the spatial mechanisms for increasing window count requires special data formatting. Referring to FIG. 4, an illustration of how data for the three channel window of FIG. 4 would be formatted is shown. Three images 400, 402, and 404 are to be formatted for the ODW. Under normal circumstances, the data comprising each image would be distributed uniformly across all of the pixels of a display. For the purposes of this formatting, each image is processed using a simple algorithm so that the data for each only occupies one third of the pixels in a horizontal direction. The available pixels in the display are also divided up into three sets, which are interlaced. Processed images 406, 408, and 410 are combined to form composite image 412. One horizontal line of pixels, 414, is shown in the composite image and magnified to show detail in 416. In this line the pixels are numbered from left to right starting with 1. In this case data from image 400 is portrayed using pixels, 1, 4, 7, 10, etc. while the next image would utilize pixels 2, 5, 8, 11, etc. and the final image would use pixels 3, 6, 9, 12, etc. Using the window architecture of FIG. 5, each image can only be seen by looking at the window from a particular point of reference. Only one image can be seen by a single viewer at a time. Other data formats may be utilized, for example, by deliberately mixing perspective information at the boundaries.

Figure 5:
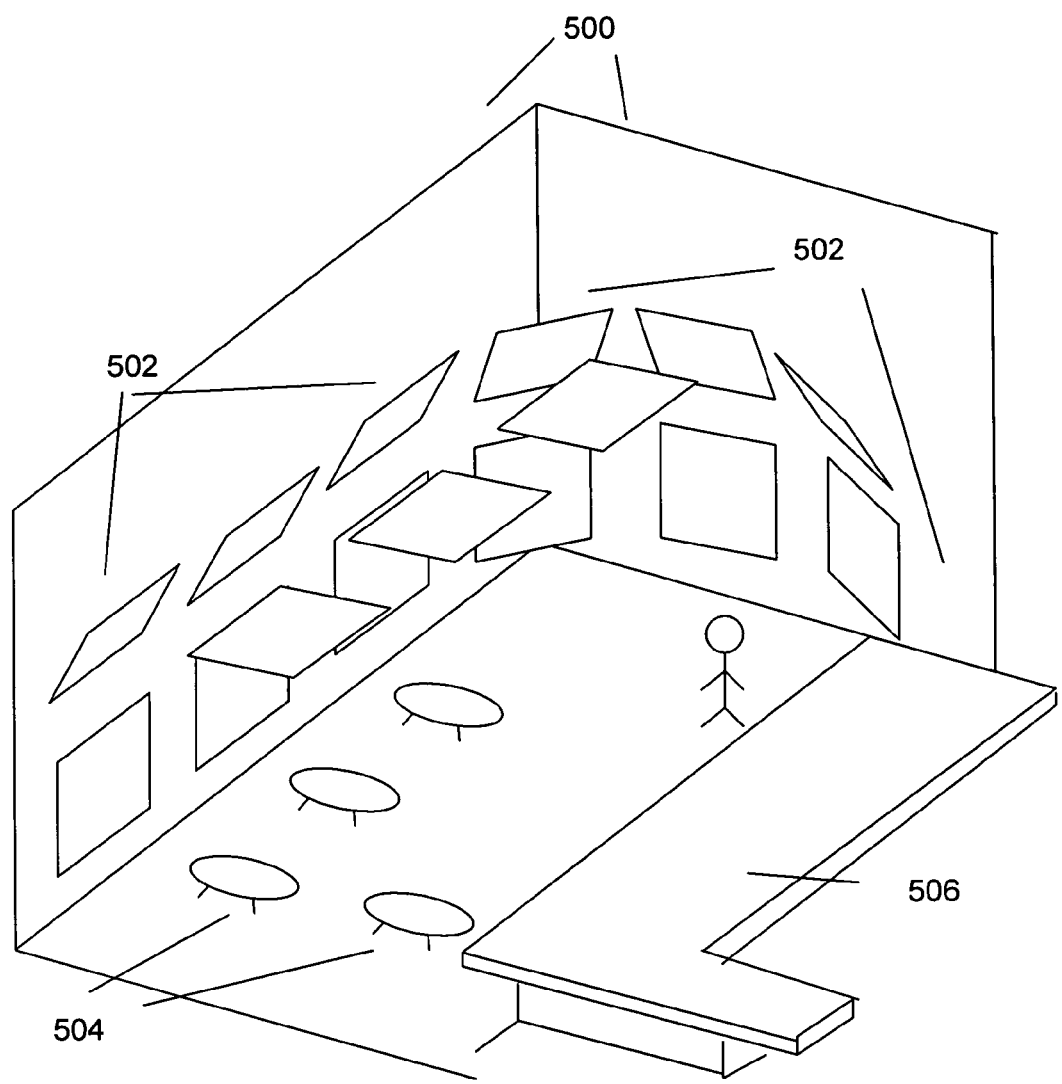
FIG. 5 illustrates a viewspace in accordance with one embodiment of the invention.

Referring now to FIG. 5, a viewspace 500 is illustrated. A viewspace is a location in the real world which is visually augmented by the presence of multiple conventional displays and/or ODWs which can portray imagery or visual content, such as representations of a synthetic environment (SE). The viewspace may be inside a building, or outside depending on the capabilities of the display devices. The configuration of the windows may be arbitrary depending on the setting and the nature of the content. Viewspace 500 is in the form of a bar or lounge where the viewspace is configured to provide a collective perspective on synthetic environment. As will be seen, the viewspace 500 includes a plurality of window 502 that are viewable from tables 504, and counter 506. It is collective in the sense that patrons of the lounge may all experience the SE at the same time, but with the benefits of the various window and viewset configurations as described earlier. Many different kinds of spaces and places, besides bars or lounges, may be augmented in this fashion.

Figure 6:
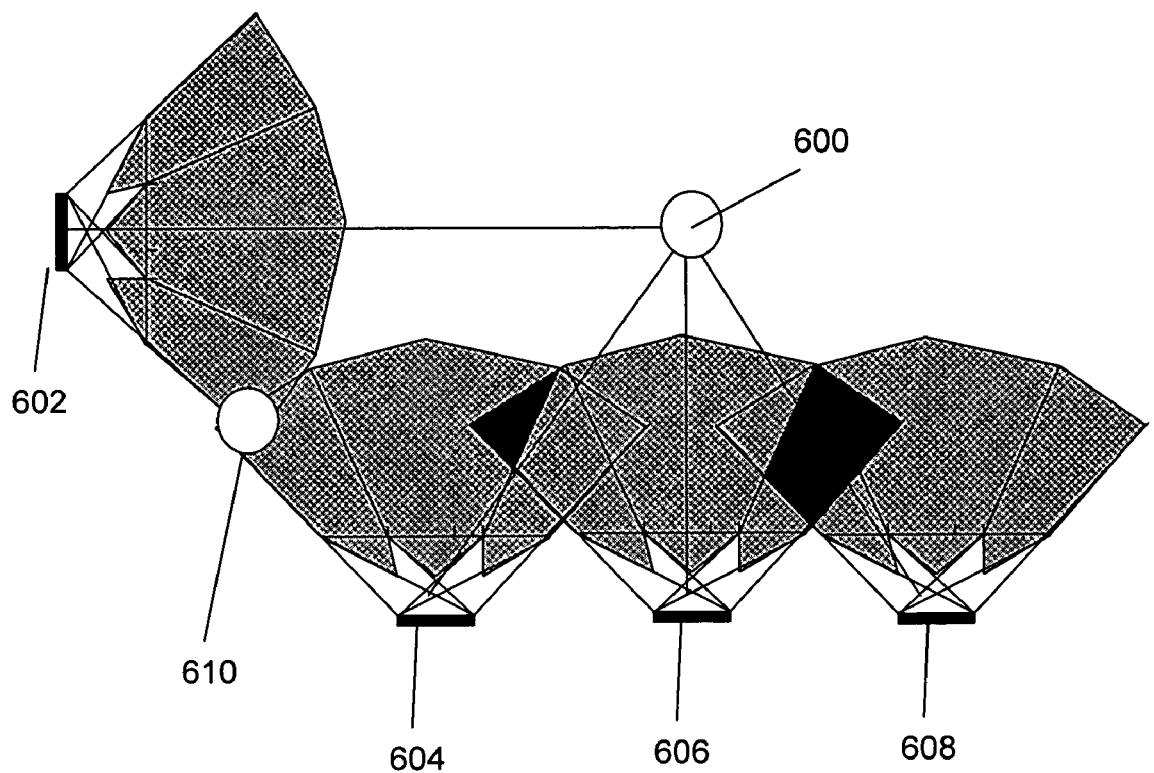
FIG. 6 illustrates a layout for a viewspace design in accordance with one embodiment of the invention.

Design of such spaces is a coupled process which takes an understanding of the performance of each ODW in the ODW array. The overarching goal is to insure that as patrons move within the space, the perspectives that they can see from their vantage point make sense for the SE that is being portrayed. Consequently the viewspace design must consider not only the viewcone patterns of each ODW, but how these cones will overlap within the space. This may necessitate that the viewing cone pattern for the ODW's vary depending on their position within the viewspace. Referring to FIG. 6 one simplified interior layout is illustrated. In this case viewer 600 is in a position to see complementary perspectives emanating from ODWs 602, 604, 606, and 608. Viewer 610, however, can only see perspectives from ODWs 602, and 604. Thus some redesign may be merited.

Additionally, it may be of interest to manipulate individual ODW viewing cones in real time to either accommodate the number and positioning of viewers and/or the kind of image information being presented. This may be accomplished using the dynamic lenticular arrays described above, and also by intelligent manipulation of the data formats. Manipulating the data position within the array can provide one means for altering the viewing cones without changing the optics. Scenarios include limiting the composite viewing angle of the ODW and compacting the perspectives into a narrower range. This would have the effect of increasing the perspective resolution (say 10 degrees/perspective vs. 20), within the composite viewing zone.

Manipulation of the overlap zones may be useful as well. The complete elimination of these zones results in sudden and potentially jarring transitions from one perspective to the other as the viewer moves. It might be advantageous to establish a finite overlap zone to ease this transition. Some combination of dynamic lensing, intelligent data formatting, and tracking could be useful. The data formatting would manipulate the position of pixels in the array to produce a comfortable blurring or transition between two perspectives. Tracking of the position of the viewer could be used to provide input to the system and thus allow for a more nuanced manipulation of data and/or optics for this and other modifications of the viewspace behavior.

Referring now to FIG. 7, a row of pixels 700 is shown with pixel data mapped from left to right in the sequence $A_1, B_1, C_1 \ldots A_2, B_2, C_3 \ldots A_n, B_n, C_n$ as is indicated by reference numeral 702. Without an asymmetric fresnel array, the viewing cone pattern 704 results. Two viewers 706, and 708 are shown. Viewer 706 resides in a non-overlapping viewing cone and is able to observe, due to the lenticular focal pattern, only the A data set. Viewer 706's scene is shown in 710 which also reveals the foreshortening of the display due to the angle at which the viewer resides. Viewer 708, on the other hand resides in an overlapping zone. The consequence of this position is that he is able to see data from both A data sets and B data sets. This scene is illustrated in 712.

Pixel row 722 includes pixel data mapped from left to right in the sequence $A_1, B_1, C_1 \ldots A_2, B_2, C_3 \ldots A_n, B_n, C_n$ as is indicated by reference numeral 720. However, pixel row 722 has different data formatting. In particular, B data is only present in the central third of the row as illustrated by region 720. This has the consequence of making invisible any image data associated with the B data set from the edges of the display as illustrated by dark regions 730. While this effect is undesirable, it is compensated for somewhat by the fact that as the viewer's position shifts closer to normal, the foreshortening is reduced so the display's horizontal width appears to lengthen. The desired benefit, of course, is that now viewer 708 no longer observes imagery 728 that comes from the B data set as illustrated in scene 726. Other kinds of data formats are possible, with or without alternative lenticular designs, which can be used to create different kinds of overlap zones for a variety of layouts.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    projecting multiple scenes simultaneously on a display screen comprising a pixel array in interlaced-fashion, for non-autostereoscopic viewing; and
    directing light for each scene away from the display screen to a distinct viewing zone, defined spatially-in relation to the display screen.

2. The method of claim 1, wherein the directing is achieved by coupling a lenticular mechanism to the display screen, the lenticular mechanism comprising lens elements arranged in relation to the pixel array, each to direct light into one of the distinct viewing zones.

3. The method of claim 2, wherein the lenticular mechanism is offset relative to the display screen.

4. The method of claim 3, wherein the lenticular mechanism is offset by an angle of 9.5°.

5. The method of claim 2, wherein a geometry of each viewing zone is determined by the geometry and focal length of the lens elements.

6. The method of claim 2, wherein a geometry of each viewing zone is determined by the positioning of pixel array elements in relation to the lens elements.

7. The method of claim 2, wherein a geometry of each viewing zone is determined by the location of image data within the pixel array.

8. The method of claim 1 further comprising, where each viewing zone is generally V-shaped and is bounded by two divergent light rays from the display screen, subsequent to the directing, passing the light through a transfer element designed to at least reduce a degree of overlap between adjacent viewing zones.

9. The method of claim 8, wherein passing the light through the transfer element comprises passing the light through a fresnel array.

10. A lenticular mechanism, comprising:
    a plurality of lens elements comprising at least first and second lens elements, the first lens element to direct light to a first zone and the second lens element to direct light to a second zone, wherein a geometry and focal length of each the first and the second lens elements is different; wherein the first and second lens elements are interspersed.

11. The lenticular mechanism of claim 10, further comprising a plurality of third elements to direct light to an associated third zone.

12. A system, comprising:
    a display capable of displaying multiple scenes simultaneously for non-autosteroscopic viewing; and
    a lenticular mechanism coupled to the display and having a plurality of lens elements to direct light from the display into distinct viewing zones defined spatially in relation to the display.

13. The system of claim 12, further comprising a transfer element coupled to the lenticular mechanism to alter an angle at which light entering the transfer element leaves the transfer element as a function of the angle of incidence of said light.

14. The system of claim 13, wherein the transfer element comprises a Fresnel array to at least reduce the degree of overlap between the viewing zones.

15. The system of claim 13, wherein the transfer element comprises microstructures defined in a planar element.

16. The system of claim 13, wherein the transfer element comprises a thin film coating.

17. The system of claim 12, wherein the lens elements have a fixed geometry.

18. The system of claim 12, wherein the lens elements have a geometry that changes.

19. The system of claim 18, wherein the changes to the geometry of the lenses are synchronized with scanning of the display.

20. The system of claim 12, wherein the lenticular mechanism is offset relative to the display.

21. The system of claim 20, wherein the offset is 9.5°.

22. The system of claim 12, wherein the display comprises pixels.

23. A method for formatting graphics data, comprising:

determining a number N of the video streams to be simultaneously displayed on a display; and formatting image data for the N video streams, so that when the formatted image data is rendered on a display, images from all N video streams are simultaneously displayed and interlaced, wherein formatting the image data comprises encoding the image data for a selected video stream such that when the data for the selected video stream is rendered, an edge portion of said selected video stream is not visible.

24. A medium to store graphics data, comprising:

a data set corresponding to N video streams, said data set being capable of being rendered on a display as a single video stream wherein images for the N video streams are simultaneously visible and interlaced, wherein the data set is encoded such that image data associated with a selected video stream has blanked out edge portions so that the lateral extent of the selected image stream when rendered is limited.

* * * * *